United States Patent Office 3,329,880
Patented July 4, 1967

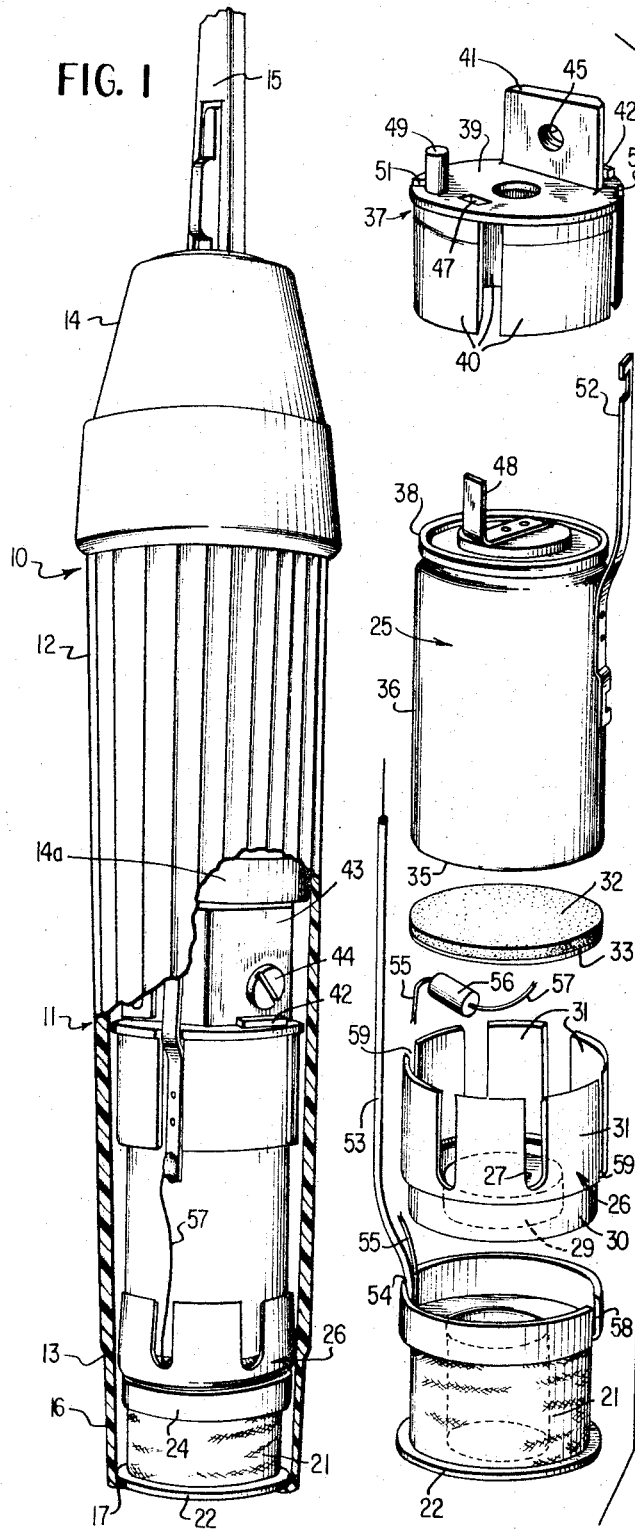

3,329,880
HAND-HELD BATTERY-OPERATED DEVICE
Robert L. Boyles, Wayland, Mass., assignor to General Electric Company, a corporation of New York
Filed Apr. 2, 1964, Ser. No. 356,842
8 Claims. (Cl. 320—2)

This invention relates to hand-held, battery-operated devices and, more particularly, to battery and charger assemblies for such devices.

In recent years a number of battery-operated, hand-held devices have been marketed in which the handle of the device encloses a motor for powering the operative elements of the devices and a battery for supplying energy to the motor. Several problems in the construction of such devices must be solved in order to provide a completely satisfactory device. For instance, it is necessary to manufacture the various elements with certain manufacturing tolerances so that they may be easily and economically assembled; however, when the complete device is assembled in the casing the various individual elements must be securely held in place so that the elements and connections between them cannot be broken by rough handling of the casing. A bellows-type switch is normally used to turn such devices on and off because such switches do not destroy the watertight integrity of the casing. Also, the operative elements are generally connected to the driving mechanism through a bellows-type seal. If excessive pressure is built up within the casing, due to heat generated by the motor or other electrical elements or by gas given off by the battery during charging, the above mentioned bellows seals may become distended and not function properly. It is therefore desirable to provide a means for equalizing the pressure inside and outside the casing. Furthermore, the battery should be shielded from the heat generated by the motor and other electrical elements to insure optimum battery operation and battery life.

It is an object of this invention to provide a hand-held, battery-operated device in which the individual components of the device are securely located within the surrounding casing.

It is another object of this invention to provide a watertight device in which the pressure within the casing is maintained substantially equal to that of the surrounding atmosphere.

It is a further object of this invention to provide such a device in which heat-sensitive elements are shielded from heat-generating elements.

In accordance with this invention, in one form thereof, there is provided a battery-operated, hand-held device including a casing which encloses the various operative components of the device. A motor is mounted in one end of the casing for operative connection to an implement. An electrical winding mounted on a coil spool is positioned in the other end of the casing and a rechargeable battery is mounted between the motor and the winding. The inner end of the coil spool is formed with a cup-like recess which receives the base portion of a coil holder. The coil holder is formed with a number of longitudinally extending, resilient fingers which fit closely about one end of the battery. The base portion of the coil holder is formed with a flat, central section surrounded by an annular recess. The flat, central section supports the end of the battery while the annular recess provides a receptacle for a diode forming a part of a rectifier circuit for recharging the battery. A resilient member supported by a stiffening member is mounted between the battery and the flat, central section to cover the recess and to take up any excess space in the device due to manufacturing tolerances. A battery holder is mounted on the other end of the battery and includes a flat plate portion extending across the end of the battery and a number of longitudinally extending resilient fingers engaging the outer wall of the battery. The plate portion is formed with a projecting screw-threaded stud which is utilized to attach the battery holder to a mounting bracket of the motor. One end of the casing is formed with a central recess. A gas-pervious, liquid-impervious plug closes the inner end of the recess to equalize the pressure within the casing and the surrounding atmosphere.

This invention will be better understood from the following description taken in conjunction with the accompanying drawing in which:

FIG. 1 is a perspective view of a hand-held, battery-operated device including one embodiment of this invention, with a portion of the casing removed for purposes of illustration;

FIG. 2 is an exploded view of a portion of the device in FIG. 1;

FIG. 3 is a partial elevational view of the device of FIG. 1, partially in cross section and partially broken away for purposes of clarity; and, FIG. 4 is a view taken along line 4—4 of FIG. 3.

Referring now to the drawing, there is shown a hand-held, battery-operating device 10 including a casing 11. The casing 11 has a central portion 12 which provides a hand grip for the user and separates a base portion 13 and head portion 14. The implement of the hand-held device 10, in the case illustrated, a toothbrush 15, is inserted within the casing through the head portion 14 to be operatively connected to a motor 14a which is enclosed within the central portion 12. The base portion 13 is formed from magnetically permeable material and includes an outer cylindrical wall 16 and a flat bottom wall 17. The bottom wall 17 is formed to include an inner cylindrical wall 18 extending upwardly within and spaced from the outer wall 16 to form an annular chamber 19 and a central recess 19a.

A plug 20 is mounted in and closes the inner end of central recess 19a. The plug 20 is formed of a sintered metal so that it provides a passage for gas between the interior of casing 11 and the surrounding atmosphere while, at the same time, it prevents the passage of moisture into the casing. Thus, differential of pressure between the interior of casing 11 and the surrounding atmosphere is equalized while the watertight integrity of the casing is maintained. By placing the plug in the inner end of recess 19a it may perform its pressure equalizing function without detracting from the appearance of the casing.

An electrical winding 21 is mounted on a coil spool 22 and inserted within the annular chamber 19. The inner end of the coil spool 22 is formed with a flat, annular wall 23 surrounded by longitudinally extending, annular outer wall 24.

A rechargeable battery 25 is mounted within the casing 11 between the coil spool 22 and the motor 14a. One end of the battery is secured to the coil spool by a coil holder 26. The base portion of the coil holder includes a flat, central section 27, and a flat, annular section 28 connected by an inner cylindrical wall 29. The outer edge of annular section 28 is joined to an outer cylindrical wall 30 so that the base portion is formed as a flat, central section surrounded by an annular recess 34. The outer wall 30 includes a number of longitudinally extending resilient fingers 31 which grip the battery 25.

The base portion of coil holder 26 is inserted in the inner end of coil spool 22 with annular section 28 engaging annular wall 23 and outer cylindrical wall 30 engaging outer wall 24. A sheet of heat-insulating, resilient material 32, supported by a strengthing member 33, is inserted in the coil holder and rests against central section 27 so that it substantially closes the top of the annular recess 34. The battery 25 is inserted within the coil holder with the base 35 of the battery resting against resilient member 32 and the fingers 31 engaging the side wall 36 of the battery. Thus, the coil spool 22 is securely connected to the battery 25, with the coil holder 26 and resilient member 32 providing a heat shield between the coil 21 and the battery 25. The resilient member 32 also functions to take up any excess space in the longitudinal direction which results from manufacturing tolerances so that the various operative elements are firmly mounted within the casing 11.

A battery holder 37, similar to the coil holder 26 is provided to connect the top 38 of the battery to the motor. The battery holder includes a flat plate portion 39 of heat insulating material which extends across the top of the battery, and a number of resilient fingers 40 which extend longitudinally from the base portion 39 to engage the side wall 36 of the battery. A screw-threaded lug 41 projects from the top portion 39 away from the battery and a second, shorter lug 42 also projects from the top portion slightly spaced from the first lug 41. A motor mounting bracket 43 is positioned between the lugs 41 and 42 and is attached to the lug 41 by a bolt 44 which extends through the bracket 43 and is received in the threaded opening 45 in lug 41. The other end of bracket 43 is attached to the motor 14a so that the motor and battery 25 are securely attached by means of the battery holder 37.

The plate portion 39 of battery holder 37 is provided with an opening 47 so that one of the terminals 48 of the battery may extend through the plate portion. A post 49 projects from the plate portion 39 adjacent the opening 47 to provide structrual support for a lead 53 connecting winding 21 to terminal 48.

In order to provide space for electrical leads to connect the winding 21, the battery 25 and the motor 14a, the coil spool 22, coil holder 26 and battery holder 37 are formed with suitable slots or notches. The outer edge of plate portion 39 is formed with notches 50 and 51 and the other terminal 52 of the battery extends through notch 50 to a point above the battery holder 37 so that it may be connected to the motor by a suitable switch (not shown). One lead 53 of the winding 21 extends upwardly through a slot or notch 54 provided in the annular wall 23 and outer wall 24 of the coil spool 22 and between two of the fingers 31 of the coil holder 26. The lead continues upwardly along the side of battery 25, through notch 51, around post 49 and is attached to terminal 48 to connect the battery to the coil 21. The other lead 55 of winding 21 extends upwardly through slot 54 in walls 23 and 24 into annular recess 34 formed in coil holder 26 where it is connected to one terminal of a diode 56. A lead 57 connects the other terminal of diode 56 to terminal 52 of the battery 25. While both leads 53 and 55 have been shown extending through the same slot 54, one or both of the leads 53 and 55 may extend through slot 58 so that a slot is provided in close proximity to the leads regardless of the point at which they extend from the electrical winding 21. The notches 54 and 58 also function to give a degree of resilience to outer wall 24 so that it will securely engage outer wall 30 of coil holder 26 when the coil holder is inserted in the coil spool. Coil holder 26 is provided with a pair of oppositely arranged slots 59 in outer wall 30. The slots 50, 51, 54, 58 and 59 permit the various leads and terminals to extend longitudinally within the casing 11 without passing between the outer edge of the coil spool 22, the coil holder 26, or the battery holder 27 and the casing 11. Therefore the coil holder, the battery holder and the coil spool may be made of a sufficient diameter to lie closely adjacent to the inside of casing 11 and thereby laterally support the various elements within the casing.

The battery 25 is electrically connected to the winding 21 by means of a rectifier circuit including lead 53, terminal 48, terminal 52, lead 57, diode 56 and lead 55. Thus, when base portion 13 of casing 11 is inserted in a battery charging device including another electrical winding an electromotive force will be induced in winding 21 and a current will flow in the rectifier circuit. The diode provides a unidirectional current to effectively charge battery 25.

Terminals 48 and 52 are electrically connected to the motor 14a by a circuit including a switch (not shown) so that, when it is desired to use the device the user merely operates the switch and the battery provides electrical energy to the motor to run the implement, the toothbrush 15 in the embodiment shown.

While a specific embodiment of the invention has been shown and described, it should be understood that the invention is not limited to the particular construction described. Accordingly, it is intended in the claims to cover all modifications within the true spirit and scope of the invention.

What I claim is:
1. For use in a hand-held, battery-operated device including an elongated, hollow casing and a motor mounted in one end of the casing; a battery and charger assembly including:
   (a) a coil having an electrical winding mounted thereon, said coil spool and winding being received in the end of the casing remote from the motor,
   (b) a rechargeable battery received in the casing between said coil spool and the motor,
   (c) a battery holder resiliently engaging one end of said battery,
   (d) said battery holder including a lug,
   (e) means for securing connecting the motor to said lug,
   (f) a coil holder resiliently engaged by said coil spool, said coil holder resiliently engaging the other end of said battery to connect said coil spool and said battery, and
   (g) means including a rectifier device for electrically connecting said winding and said battery.

2. A battery and charger assembly as described in claim 1 wherein said battery holder includes a plate portion extending across said one end of said battery, a plurality of resilient fingers extending from said plate portion and engaging said battery, a screw-threaded lug extending from the side of said plate portion opposite said battery and a bolt received in said lug for securely connecting the motor to said battery holder.

3. For use in a hand-held, battery-operated device including an elongated, hollow casing and a motor mounted in one end of the casing; a battery and charger assembly including:
   (a) a coil spool having an electrical winding mounted thereon, said coil spool and winding being received in the end of the casing remote from the motor,
   (b) the inner end of said coil spool including an annular wall portion extending toward the motor end of the casing,
   (c) a rechargeable battery received in the casing between said coil spool and the motor,
   (d) a battery holder resiliently engaging one end of said battery,
   (e) a lug formed in said battery holder opposite said battery,
   (f) means for securely connecting the motor to said lug,
   (g) a coil holder including a base portion resiliently received within said wall portion of said coil spool,
   (h) said coil holder also including a plurality of resilient fingers projecting from said base portion and engaging said battery to connect said battery to said coil spool, and
   (i) means including a rectifier device for electrically connecting said winding and said battery.

4. For use in a hand-held, battery-operated device including an elongated, hollow casing and a motor mounted in one end of the casing; a battery and charger assembly including:
   (a) a coil spool having an electrical winding mounted thereon, said coil spool and winding being received in the end of the casing remote from the motor, (b) the inner end of said coil spool including an annular wall portion extending toward the motor end of the casing, (c) a rechargeable battery received in the casing between said coil spool and the motor, (d) a battery holder resiliently engaging one end of said battery, (e) a lug formed in said battery holder opposite said battery, (f) means for securely connecting the motor to said lug, (g) a coil holder including a base portion, said base portion having a flat central section and an annular recess surrounding said central section, said base portion being resiliently received within said wall portion of said coil spool, (h) a plurality of resilient fingers projecting from said base portion of said coil holder and engaging said battery, (i) a diode received in said annular recess, (j) means including said diode electrically connecting said winding and said battery.

5. A battery and charger assembly as described in claim 4 wherein a resilient member supported by a strengthening member is received in said coil holder against said central section and closing said annular recess.

6. In a hand-held, battery-operated device:
(a) an elongated casing, one end of said casing including a central recess, (b) a plug of gas-pervious, liquid-impervious material received in said recess to insure that the pressure within said casing is substantially equal to the pressure of the surrounding atmosphere, (c) a coil spool having an electrical winding mounted thereon, said coil spool and winding being received in said casing about said recess, the inner end of said coil spool including an annular wall portion extending toward the other end of said casing, (d) a motor mounted in said other end of said casing, (e) a rechargeable battery received in said casing between said coil spool and said motor, (f) said battery including a generally cylindrical side wall and a pair of spaced apart end walls, a first terminal of said battery mounted on and extending from the first of said end walls, and a second terminal mounted on said side wall, (g) a coil holder including a base portion, said base portion having a flat central section and an annular recess surrounding said central section, said base portion being resiliently received within said annular wall portion of said coil spool, (h) a plurality of resilient fingers projecting from said base portion of said coil holder and engaging said side wall of said battery, (i) a resilient member supported by a strenghtening member received in said coil holder between said central section and the second of said end walls of said battery, said resilient member and strengthening member closing said annular recess, (j) a diode received in said annular recess, (k) a battery holder including a plate portion extending across said first end wall of said battery, said plate portion including an opening to receive said first terminal of said battery, (l) a plurality of resilient fingers extending from said plate portion of said battery holder and engaging said side wall of said battery, (m) a lug extending from said plate portion of said battery holder opposite said battery, (n) means for securely connecting said motor to said lug, (o) a first lead electrically connecting said winding to said diode, a second lead electrically connecting said diode to said first terminal of said battery and a third lead electrically connecting said winding to said second terminal of said battery.

7. A hand-held, battery-operated device including:
(a) a motor for powering said device,
(b) a battery,
(c) means electrically connecting said battery to said motor, for providing electric energy to said motor,
(d) a casing enclosing said motor and said battery, said casing having a wall formed with an inside surface adjacent to said battery and an outside surface in contact with the surrounding atmosphere, an aperture formed in said wall, and
(e) a plug of gas-pervious, liquid-impervious material received in said aperture and extending through said casing wall, said plug preventing water from entering said battery powered device from the outside of said casing but allowing gas to pass from the inside of said casing to the outside of said casing to insure that the pressure within said casing is substantially equal to the pressure of the surrounding atmosphere and to insure that no extraneous water will enter said casing to impair the effectiveness of the electric motor and said battery.

8. A hand-held, battery-operated device including:
(a) a casing,
(b) a motor mounted in said casing for powering said device,
(c) a battery mounted in said casing,
(d) means electrically connecting said battery and said motor for providing electric energy to said motor,
(e) one end of said casing having a wall formed with a central recess, and
(f) a plug of gas-pervious, liquid-impervious material received in the inner end of said recess extending through said wall, said plug preventing water from entering said battery powered device from the outside of said casing but allowing gas to pass from the inside of said casing to the outside of said casing to insure that the pressure within said casing is substantially equal to the pressure of the surrounding atmosphere and to insure that no extraneous water will enter said casing to impair the effectiveness of the electric motor and said battery.

References Cited

UNITED STATES PATENTS

| 2,312,463 | 3/1943 | Zdansky | 240—10.6 |
| 3,143,697 | 8/1964 | Springer | 320—2 |
| 3,211,935 | 10/1965 | Sones | 310—87 |

JOHN F. COUCH, *Primary Examiner.*

S. WEINBERG, *Assistant Examiner.*